United States Patent
Honeck et al.

(10) Patent No.: US 9,353,486 B2
(45) Date of Patent: May 31, 2016

(54) LOAD BALANCED TRACK SWITCH HEATING

(75) Inventors: Randall G. Honeck, Maple Grove, MN (US); Jason L. Honeck, Maple Grove, MN (US)

(73) Assignee: Railway Equipment Company, Inc., Plymouth, MN (US)

( * ) Notice: Subject to any disclaimer, the term of this patent is extended or adjusted under 35 U.S.C. 154(b) by 414 days.

(21) Appl. No.: 13/587,419

(22) Filed: Aug. 16, 2012

(65) Prior Publication Data

US 2013/0220991 A1    Aug. 29, 2013

Related U.S. Application Data

(60) Provisional application No. 61/524,006, filed on Aug. 16, 2011.

(51) Int. Cl.
*E01B 7/24* (2006.01)
*H05B 1/02* (2006.01)
*H02J 3/14* (2006.01)

(52) U.S. Cl.
CPC ... *E01B 7/24* (2013.01); *H02J 3/14* (2013.01); *H05B 1/02* (2013.01); *H05B 1/023* (2013.01); *H05B 2203/007* (2013.01)

(58) Field of Classification Search
None
See application file for complete search history.

(56) References Cited

U.S. PATENT DOCUMENTS

| | | | |
|---|---|---|---|
| 6,355,915 B1 * | 3/2002 | Ziaimehr et al. | 219/486 |
| 6,541,740 B2 * | 4/2003 | Ziaimehr et al. | 219/486 |
| 8,119,952 B2 * | 2/2012 | Palmer et al. | 219/483 |
| 2002/0030048 A1 * | 3/2002 | Ziaimehr et al. | 219/486 |

OTHER PUBLICATIONS

Railway Equipment Company, Model 922 Switch Heater Control, P/N R9220-0103D, May 2011, 39 pages.

* cited by examiner

*Primary Examiner* — Joseph M Pelham
(74) *Attorney, Agent, or Firm* — Merchant & Gould P.C.

(57) ABSTRACT

An electrical load balanced heating system and method. The load balanced heating system and method is configured to facilitate smooth electrical operation as well as energy savings. The system is configured to group the heating elements based on load characteristics of the heating elements and turn the groups on and off sequentially in a matter that promote efficient and smooth operations.

5 Claims, 9 Drawing Sheets

LOAD BALANCED TRACK SWITCH HEATING

CROSS REFERENCE TO RELATED APPLICATIONS

This application claims the benefit of U.S. Provisional Patent Application Ser. No. 61/524,006 filed Aug. 16, 2011, which is incorporated herein by reference in its entirety.

TECHNICAL FIELD

The present disclosure provides a heating system and method that includes an electrically load balanced energy save mode.

BACKGROUND

Rail trains are switched from one track to another at track switches. Track switches typically include moving components that may not function properly if they are frozen or covered by ice and snow. Accordingly, heating systems have been used to melt the snow and ice from various track switch components. The heating systems typically include multiple heating elements located at different points in the track switch system. It is desirable to operate the heating in both a full power mode when ice and snow have accumulated on the track switch components, and a power save mode to prevent ice and snow from accumulating. One known track switch heating system is Railway Equipment Company's Model 922 Switch Heater Controller, which is capable of controlling multiple heating elements located at a track switch in both a high heat mode and a low heat mode.

Improvements in such heating systems are desirable. For example, it is desirable to provide a system that can switch from mode to mode while maintaining smooth operations that minimizes any potential disruption to the electrical grid upon which it is connected.

SUMMARY

The present disclosure provides an electrical load balanced heating system and method. The load balanced heating system and method is configured to facilitate smooth electrical operation as well as energy savings. The system is configured to group the heating elements based on load characteristics of the heating elements and turn the groups on and off sequentially in a matter that promote efficient and smooth operations.

DETAILED DESCRIPTION

The present disclosure provides an electrical load balanced heating system and method. In one embodiment, the load balanced heating system and method is used to melt and/or prevent accumulation of ice and snow at a railway track switch. Other embodiments are possible. For example, the systems and methods of the present disclosure are generally applicable to any situation where it is desirable to switch one or more devices from mode to mode while maintaining smooth operations that minimize any potential disruption to an electrical grid upon which the devices are connected.

Figure 1:
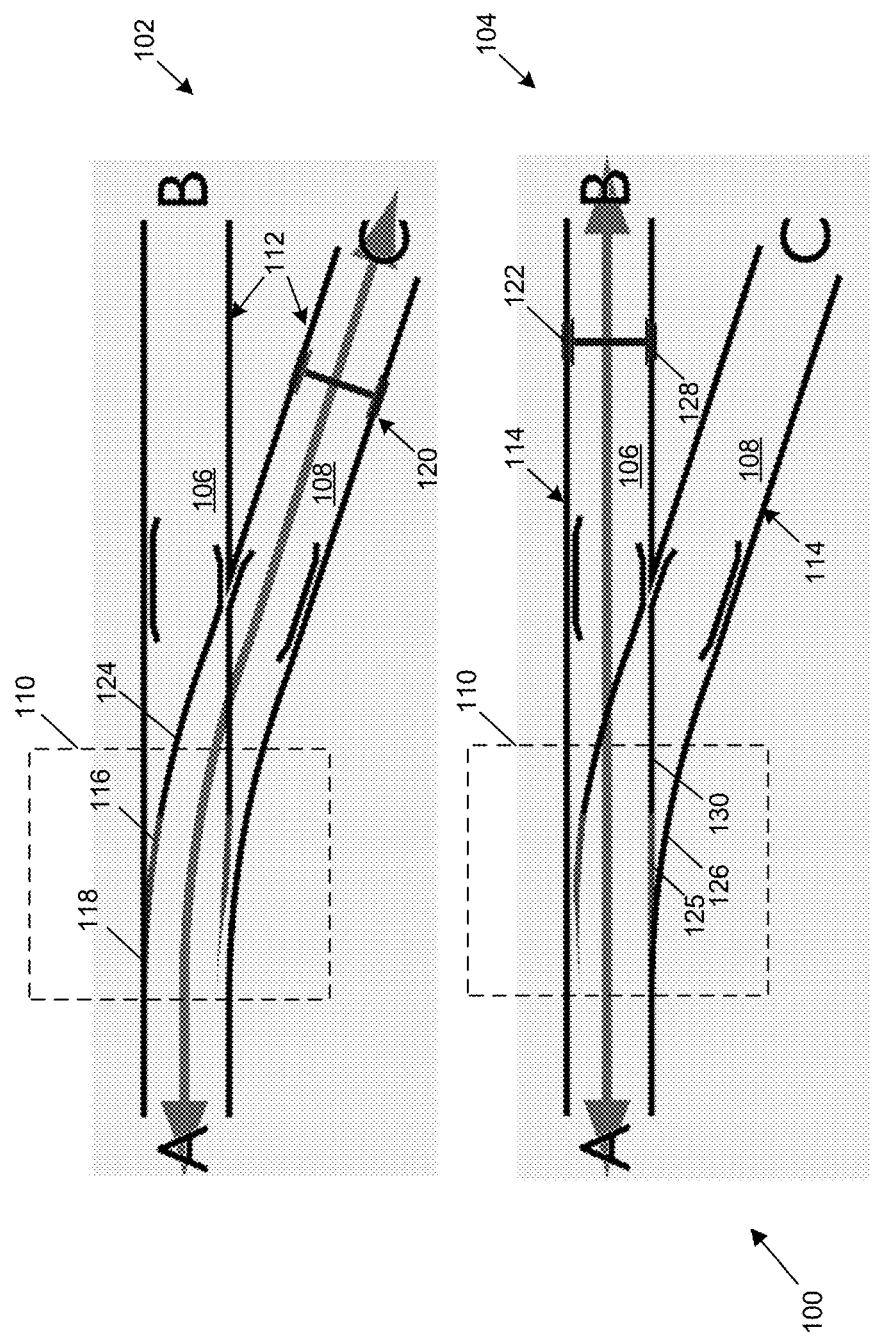
FIG. 1 shows an example diagram of an example railway track switch in a first and second position.

Referring now to FIG. 1, an example railway track switch 100 in a first position 102 and a second position 104 is shown according to the principles of the present disclosure. The railway track switch 100 in the depicted embodiment is a mechanical installation that enables railway vehicles to be selectively guided to a thru-track 106 or to a diverging track 108 via a junction 110. In the example shown, the railway track switch 100 is a right-handed switch in that the diverging track 108 deviates to the right of the thru-track 106. However, many other embodiments are possible. For example, the railway track switch 100 can be any other type of turnout or set of points in which at least two rail routes converge and/or diverge. Examples include a slip switch, a stub switch, a plate switch, a three-way switch, a wye switch, and others.

The example railway track switch 100 includes a pair of switch rails 112 positioned between a pair of diverging stock rails 114.

In the first position 102, a left point 116 of the switch rails 112 is connected to a left stock rail 118 of the stock rails 114 (left and right are described herein from the point of view of a railway vehicle traveling along the track from the left side of FIG. 1 to the right side of FIG. 1). When wheels 120 of a railway vehicle (not shown) reach this connection, a left wheel 122 of the wheels 120 is guided along a left switch rail 124 of the switch rails 112, and the wheels 120 will transfer to the right along the diverging track 108.

In the second position 104, a right point 125 of the switch rails 112 is connected to a right stock rail 126 of the stock rails 114. When wheels 120 reach this connection, a right wheel 128 of the wheels 120 is guided along a right switch rail 130 of the switch rails 112, and the wheels 120 will continue along the thru-track 106.

Figure 2:
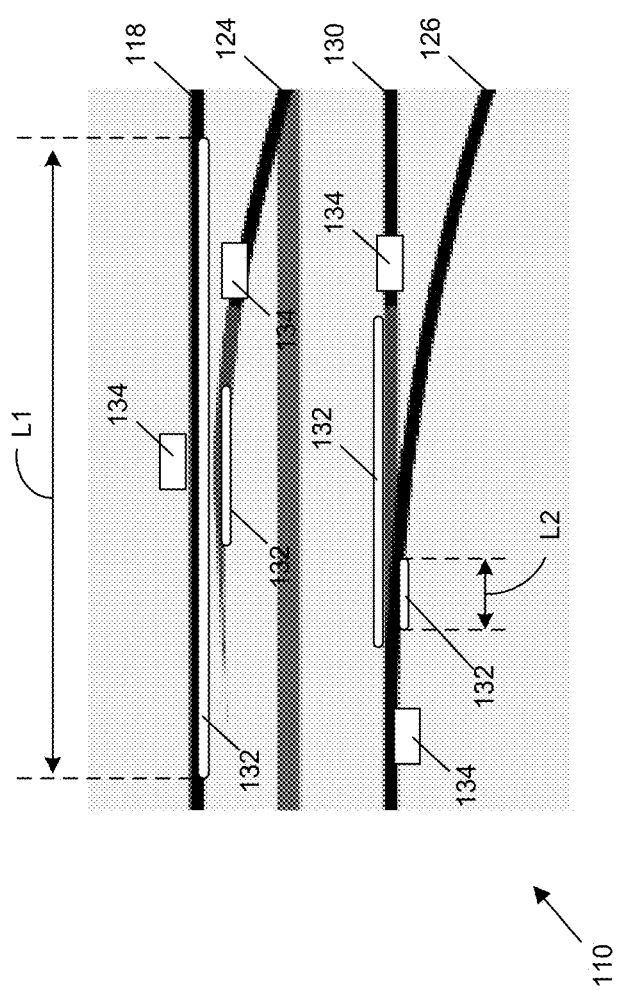
FIG. 2 shows a junction of the railway track switch of FIG. 1, including a plurality of heating elements and temperature sensors positioned thereto.

Referring now to FIG. 2, the junction 110 of FIG. 1 is shown in further detail including a plurality of heating elements 132 and a plurality temperature sensors 134 positioned at different locations along the switch rails 112 and the stock rails 114. In the example shown, a single temperature sensor 134 is associated with a single heating element 132. However, many other embodiments are possible. For example, in some embodiments, more or less temperature sensors 134 are associated with any given heating element 132. It should be appreciated that other sensor configurations are possible, for example, an ambient temperature sensor can be used to determine when the heating elements should be turned on or off and what power mode they should be in.

In example embodiments, the heating elements 132 are resistive heat elements (e.g., resistive strip heating elements) of arbitrary physical dimension and power rating or current draw that are selectively chosen based on which of the switch rails 112 and the stock rails 114 the heating elements 132 are positioned thereto. For example, the heating element 132 positioned to the left stock rail 118 may be selectively chosen to have a length L1 and a rated current draw of 100 A, whereas the heating element 132 positioned to the right stock rail 126 may be selectively chosen to have a length L2 and a current draw of 50 A.

In general, the railway track switch 100 may not function properly if one or more corresponding switching components are frozen or covered by ice and snow. When such inclement weather conditions are present and/or anticipated, the heating elements 132 are selectively turned on and off based on readings of the temperature sensors 134 to melt and/or prevent accumulation of ice and snow, as described in further detail below in connection with FIGS. 3-9.

Figure 3:
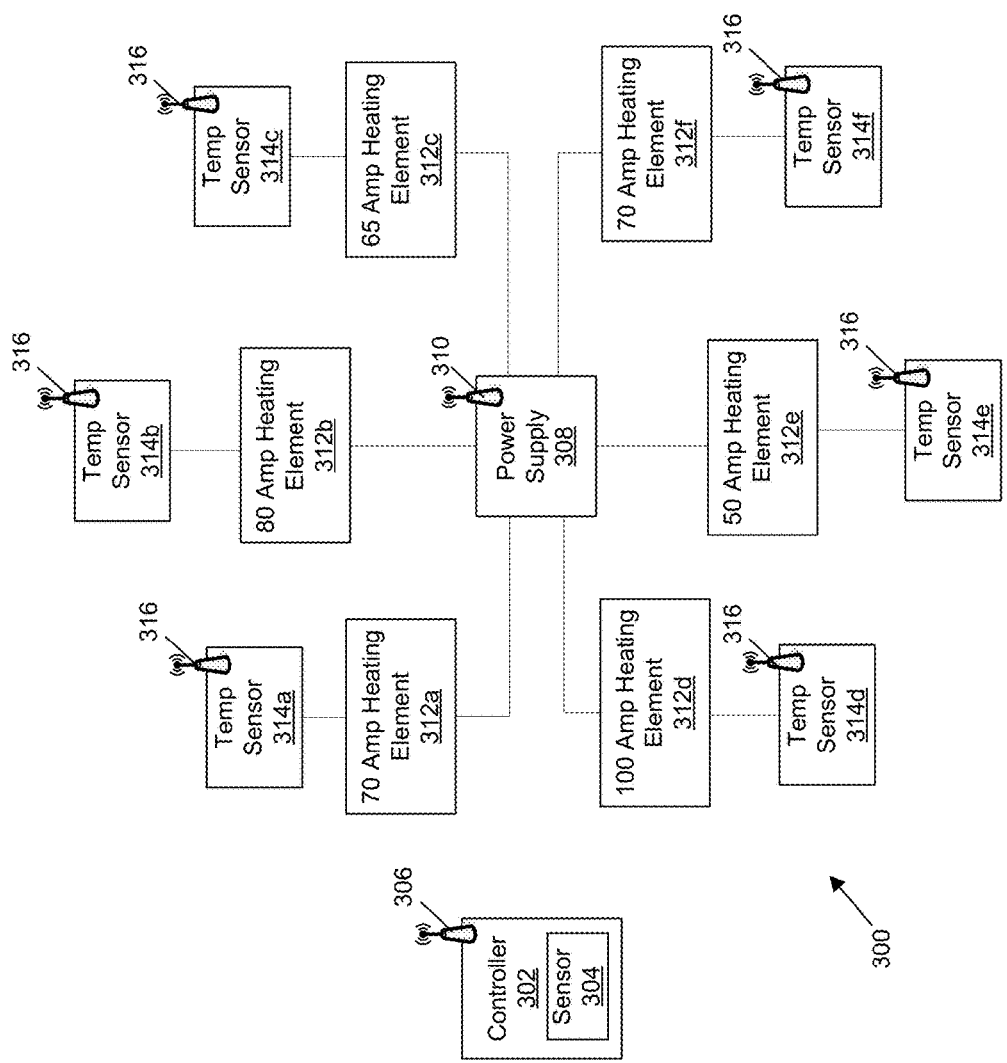
FIG. 3 shows an example diagram of a track switch heating system.

Referring now to FIG. 3, an example railway track switch heating system 300 is shown according to the present disclosure. In general, the heating system 300 is configured for melting snow and ice on a track switching system, such as the example railway track switch 100 described above in connection with FIGS. 1-2. Other embodiments are possible.

In the depicted embodiment, incorporated within the example heating system 300 is a controller 302 configured to include a controller sensor 304 and a controller transceiver 306, and a power supply 308 configured to include a power supply transceiver 310. The heating system 300 also includes a plurality of heating elements 312a-f (collectively, heating elements 312) each coupled to the power supply 308 and configured to be connected to different locations or sections of rail of a track switching system. The heating system 300 still further includes a plurality of temperature sensors 314a-f (collectively, temperature sensors 314) each coupled to one of corresponding heating elements 312a-f. Each of the temperature sensors 314 are configured to include a temperature sensor transceiver 316.

In example embodiments, the power supply 308 is a 480VAC device that supplies electrical energy to the heating elements 312. Additionally, the heating element 312a is a 70 A resistive heat strip, heating element 312b is an 80 A resistive heat strip, heating element 312c is a 65 A resistive heat strip, heating element 312d is a 100 A resistive heat strip, heating element 312e is a 50 A resistive heat strip, and heating element 312f is a 70 A resistive heat strip.

Other embodiments of the heating system 300 are possible. For example, the heating system 300 may include more or fewer components having similar or alternate parameter ratings as desired, and communication between respective components of the heating system 300 may generally be established via hardwired and/or wireless connection(s).

In the depicted embodiment, the controller 302 is configured to communicate with the power supply 308 via the controller transceiver 306 and power supply transceiver 310 at least when the controller sensor 304 detects a predetermined weather condition, such as falling snow, freezing rain, below freezing temperatures, etc. The controller 302 controls outputs of the power supply 308 to switch the heating elements 312 to a full power mode to melt and/or prevent accumulation of ice and snow on a track switching system (e.g., railway track switch 100).

The controller 302 is additionally configured to communicate with the power supply 308 to control and transfer heating elements 312 from the full power mode to a power save mode when rail temperature sensed by a corresponding temperature sensor 314 associated with a given heating element 312 exceeds a predetermined threshold (e.g., 80° F., 95° F., 100° F., etc.). Readings from a given temperature sensor 314 are transferred to the controller 302 via the controller transceiver 306 and a corresponding temperature sensor transceiver 316.

Figure 4:
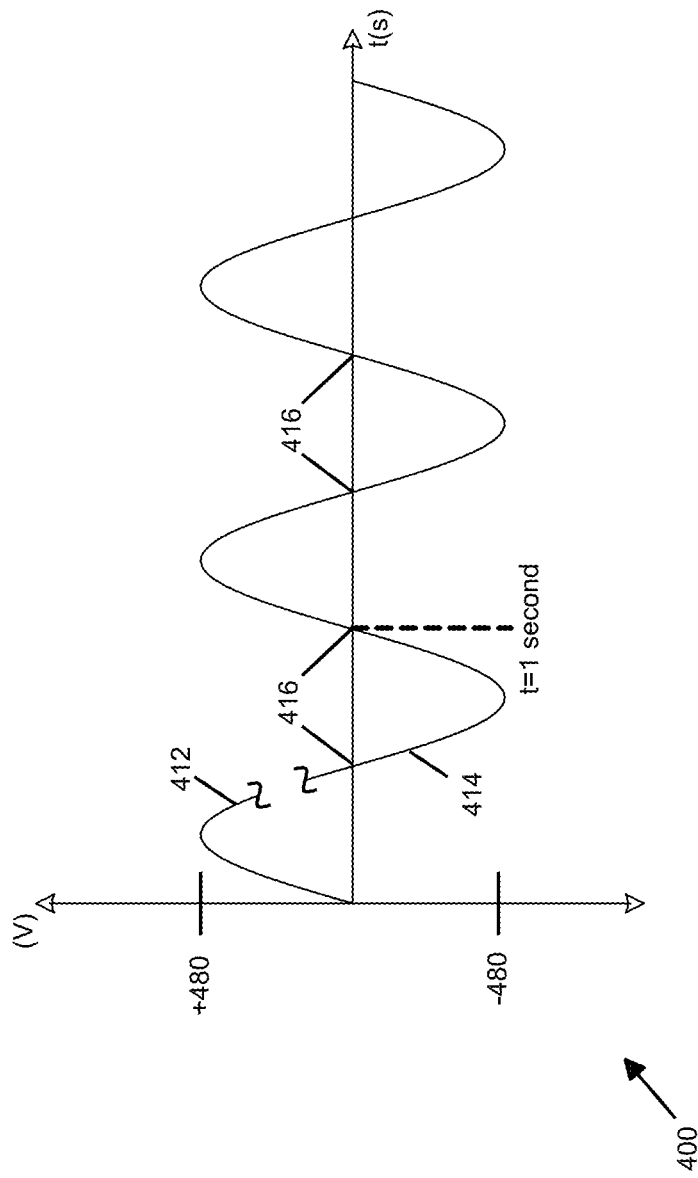
FIG. 4 shows is an example illustrative voltage waveform illustrating heating element groups being turned on and off in sequence.
Figure 5:
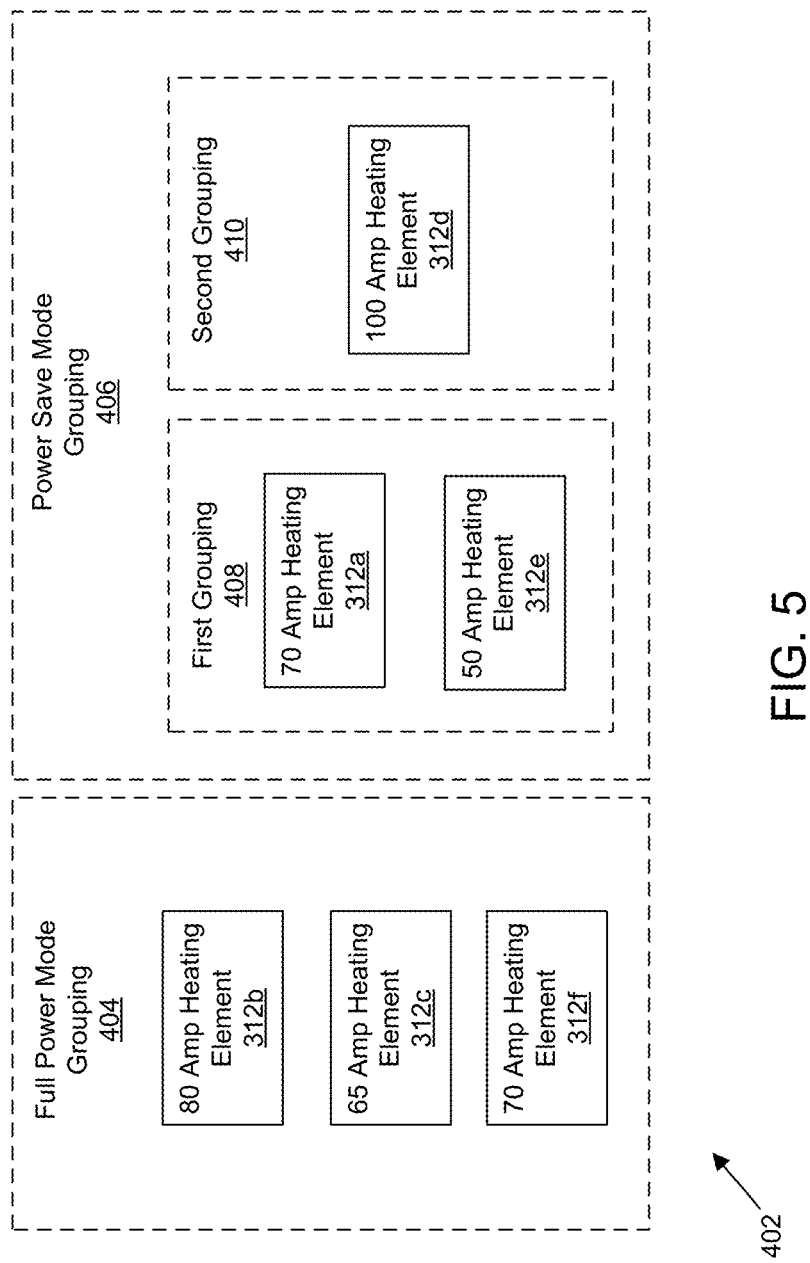
FIG. 5 shows an example diagram illustrating groupings of heating elements based on amperage draws while at least some heating elements are not yet in power save mode.
Figure 6:
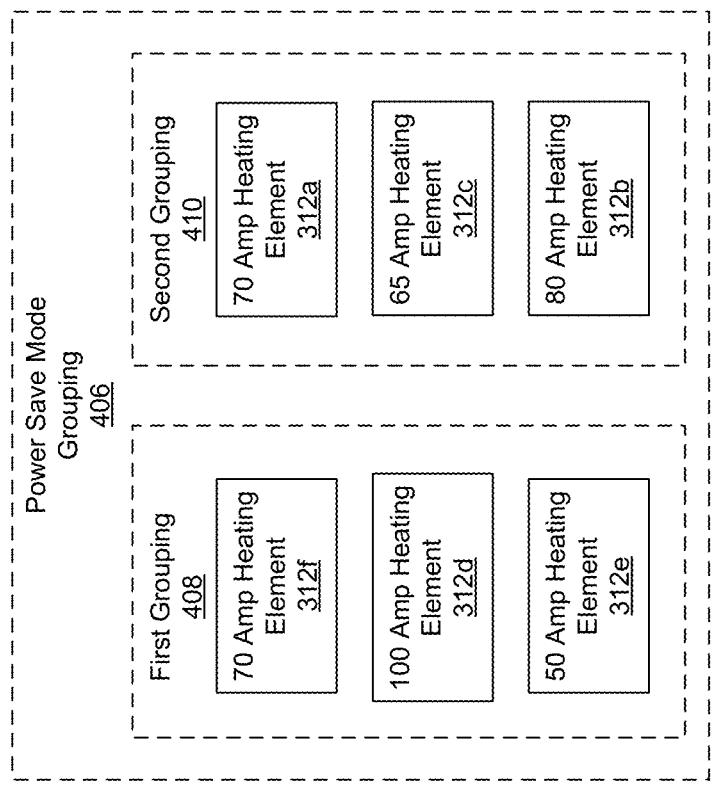
FIG. 6 shows an example diagram illustrating groupings of heating elements based on amperage draws after all heating elements are in power save mode.

For example, referring now additionally to FIGS. 4-6, the controller 302 is configured to initially place the heating elements 312 to a full power mode and then turn on and off the heating elements 312 in a power save mode in a sequence that minimizes fluctuations in overall current draw of the heating system 300.

FIG. 4 shows an example voltage waveform 400 generally supplied from the power supply 308 to the heating elements 312 of FIG. 3. In this example, the voltage waveform 400 is a 60 Hz, 960V peak-peak waveform. Any number of other embodiments are possible. It should be appreciated that FIG. 4 discloses a waveform for illustrative purposes only (e.g., a 1 Hz waveform). It should be appreciated that in a 60 Hz waveform there would be 60 waves between time zero and the first second, in a 100 Hz waveform there would be 100 waves between time zero and the first second, and in a 50 Hz waveform there would be 50 waves between time zero and the first second. Also the peak to peak will vary based on the particular waveform as well. For example, instead of 960V peak-peak other peak-peak waveforms are possible (e.g., 480V peak-peak).

FIG. 5 shows a grouping diagram 402 in which the 80 A heating element 312b, 65 A heating element 312c, and 70 A heating element 312f of FIG. 3 are in a full power mode grouping 404. In example embodiments, the voltage waveform 400 of FIG. 4 is supplied to all heating elements in the full power mode grouping 502 over a full period t=1 second (see FIG. 4). For example, the 80 A heating element 312b is supplied with both the positive cycle and negative cycle of the voltage waveform 400 when this respective heating element is in the full power mode grouping 404.

In contrast, the 70 A heating element 312a, 50 A heating element 312e, and 100 A heating element 312d of FIG. 3 are in a power save mode grouping 406. The respective heating elements 312a, 312e, and 312d are transitioned into the power save mode grouping 406 from the full power mode grouping 404 when rail temperature sensed by an associated temperature sensor 314 exceeds a predetermined threshold (e.g., 100° F.). As mentioned above, the controller 302 is configured to communicate with each of the temperature sensors 314 via the controller transceiver 306 and a corresponding temperature transceiver 316.

More specifically, in the depicted embodiment as rail temperature sensed by a temperature sensor 314 associated with a given heating element 312 in the full power mode grouping 404 exceeds a predetermined threshold value, the controller 320 is configured to evaluate amperage draw of each corresponding heating element 312, and group the heating elements 312 into a first and second grouping such that: a) a difference in total amperage draw between the first and second grouping are minimized; and b) total amperage draw is no more than the maximum amperage draw of any single heating element 312.

For example, and still referring to FIG. 5, the 70 A heating element 312a and the 50 A heating element 312e are placed into a first grouping 408, and the 100 A heating element 312d is placed into a second grouping 410. In example embodiments, the controller 302 is configured to dynamically place heating elements 312 within the first and second grouping 408, 410 to minimize a difference in total amperage draw (i.e., (70 A+50 A)−100 A=20 A instead of (100 A+50 A)−70

A=80 A)) to balance power distribution within the heating system 300, described in further detail below.

As rail temperature associated with the 80 A heating element 312b, 65 A heating element 312c, and 70 A heating element 312f of the full power mode grouping 404 progressively exceed the predetermined threshold value, these respective heating elements 312 are transitioned from the full power mode grouping 404 to the power save mode grouping 406. In example embodiments, the controller 302 is configured to regroup all heating elements 312 within the power save mode grouping 406.

For example, FIG. 6 shows the power save mode grouping 406 in which the 70 A heating element 312f, 100 A heating element 312d, and 50 A heating element 312e are placed into the first grouping 408, and the 70 A heating element 312a, 65 A heating element 312c, and 80 A heating element 312b are placed into the second grouping 410. A difference in total amperage draw (i.e., (70 A+100 A+50 A)−(70 A+65 A+80 A)=5 A) is minimized to balance power distribution within the heating system 300.

In general, the voltage waveform 400 of FIG. 4 is supplied to respective heating elements within the first grouping 408 for one half of the full period of the voltage waveform 400, and supplied to respective heating elements within the second grouping 410 for the other half of the full period.

For example, in one embodiment, the voltage waveform 400 is supplied to the 70 A heating element 312f, 100 A heating element 312d, and 50 A heating element 312e as positioned within the first grouping 408 in FIG. 6 during the positive cycle 412 of the voltage waveform 400 (see FIG. 4), and supplied to the 70 A heating element 312a, 65 A heating element 312c, and 80 A heating element 312b as positioned within the second grouping 410 in FIG. 6 during the negative cycle 414 of the voltage waveform 400. In this example, voltage is switched between the first grouping 408 and the second grouping 410 at each of a plurality of the zero crossings 416 of the voltage waveform 400. Such an arrangement beneficially minimizes introduction of unwanted high frequency harmonics into the heating system 300, and further reduces stress or shock to the heating elements 312 that would otherwise be incurred if a finite non-zero voltage were instantly applied thereto. The switching can be controlled in other means as wells such as by time, for example, on and off every half a second.

Figure 7:
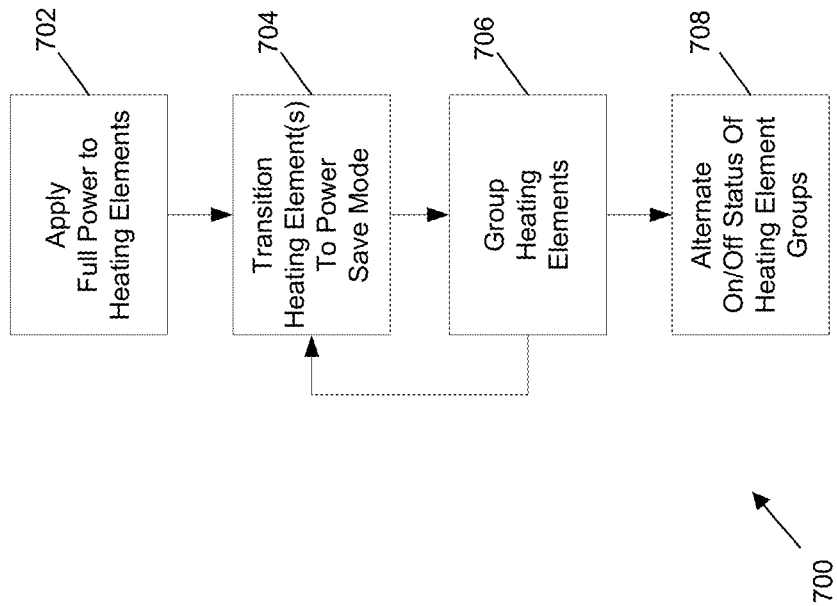
FIG. 7 shows is an example flow chart for load balancing a heating system.

Referring now to FIG. 7, an example method 700 is shown for load balancing the heating system 300 of FIG. 3 according to the present disclosure. In example embodiments, the method 700 is implemented by the controller 302, which is generally located remotely from the power supply 308 and heating elements 312.

The method begins at an operation 702. At operation 702, the controller 302 places at least two of the heating elements 312 in the full power mode grouping 404 in which the voltage waveform 400 of FIG. 4 is supplied to each of those heating elements 312 over a full period of the voltage waveform 400. In one embodiment, the heating elements 312 are placed in full power mode upon the controller sensor 304 detecting a predetermined weather condition to melt and/or prevent accumulation of ice and snow on an associated track switching system. Other embodiments are possible.

At an operation 704, the controller 302 automatically switches one or more of the at least two heating elements 312 from the full power mode grouping 404 to the power save mode grouping 406 once sensed temperature associated with a given heating element 312 exceeds a predetermined temperature threshold value. In general, the temperature threshold value is greater than the freezing point of water. Example temperature threshold values include 50° F., 80° F., 100° F., 150° F., etc. Other embodiments are possible.

At an operation 706, the controller 302 groups the at least two heating elements 312 into the first grouping 408 and second grouping 410 of the power save mode grouping 406. In example embodiments, the controller 302 groups the at least two heating elements 312 such that the difference in total amperage draws between the first grouping 408 and second grouping 410 are minimized, and the difference in the total amperage draw between the first grouping 408 and second grouping 410 is no more than a maximum amperage draw of any single heating element 312.

In example embodiments, a loop is established between operation 704 and operation 706 until each one of the heating elements 312 are transferred from full power mode grouping 404 to the power save mode grouping 406. In general, the controller 320 is configured to regroup all heating elements 312 within the first grouping 408 and second grouping 410 as new heating elements 312 are added to the power save mode grouping 406.

At an operation 708, the controller 302 periodically or at least intermittently turns on and off those heating elements 312 within the first grouping 408 and second grouping 410 based on which one of the first grouping 408 and second grouping 410 respective heating elements 312 are placed in. In example embodiments, the voltage waveform 400 is supplied to those heating element(s) 312 in the first grouping 408 during the positive cycle 412 of the voltage waveform 400 (see FIG. 4), and supplied to those heating element(s) 312 in the second grouping 410 during the negative cycle 414 of the voltage waveform 400. Other embodiment are possible (e.g., some embodiments include more than two groups (e.g., 3 or 4 groups) that are configured to turn on and off in sequence thereby resulting in one third power mode or one quarter power mode instead of the one half power mode described above).

Figure 8:
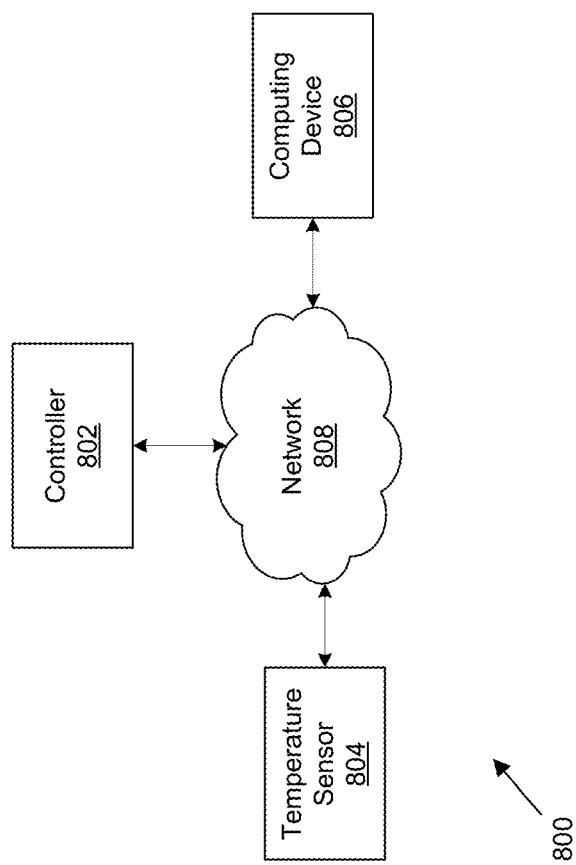
FIG. 8 shows an example networked communication environment.

Referring now to FIG. 8, an example networked computing environment 800 is shown in which aspects of the present disclosure may be implemented. The example networked computing environment 800 includes a controller 802, a temperature sensor 804, a computing device 806, and a network 808. However, other embodiments of the networked computing environment 800 are possible. For example, the networked computing environment 800 may generally include more or fewer devices, networks, and other components as desired.

In general, the networked computing environment 800 can be installed throughout a location, such as a railyard, such that an operator of the computing device 806 can monitor and program the controller 802 to electrically load balance a heating system to facilitate smooth electrical operation, as well as enjoy energy savings. In example embodiments, the controller 802 corresponds to the controller 302, and the temperature sensor 804 corresponds to the temperature sensors 314 described above in connection with FIGS. 1-7. An example computing device useable as computing device 806 is described further below in connection with FIG. 9.

The network 808 is a bi-directional data communication path for data transfer between one or more devices. In the example shown, the network 808 establishes a communication path for data transfer between the controller 802 temperature sensor 804, and computing device 806. In general, the network 808 can be of any of a number of wireless or hardwired WAN, LAN, Internet, or other packet-based communication networks such that data can be transferred among the elements of the example networked computing environment 800. Other embodiments of the networked computing environment 800 are possible as well.

Figure 9:
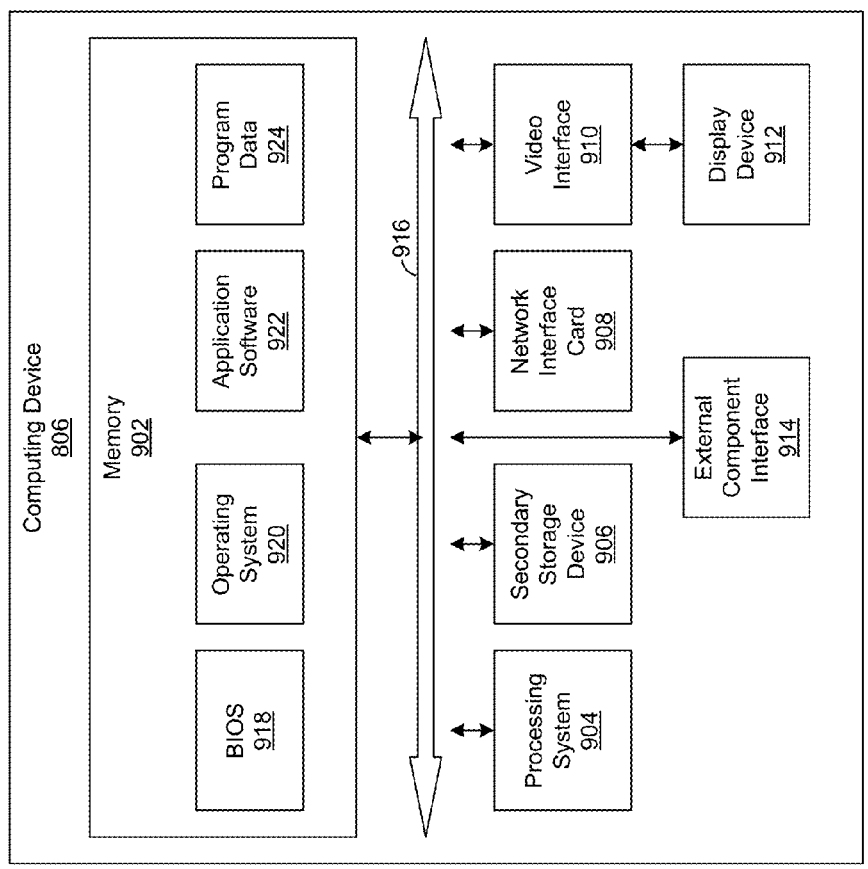
FIG. 9 shows an example diagram illustrating example physical details of an electronic computing device.

FIG. 9, shows the computing device 806 of FIG. 8 in detail. In example embodiments, the computing device 806 includes a memory 902, a processing system 904, a secondary storage device 906, a network interface card 908, a video interface 910, a display unit 912, an external component interface 914, and a communication medium 916. The memory 902 includes one or more computer storage media capable of storing data and/or instructions. In different embodiments, the memory 902 is implemented in different ways. For example, the memory 902 can be implemented using various types of computer storage media.

The processing system 904 includes one or more processing units. A processing unit is a physical device or article of manufacture comprising one or more integrated circuits that selectively execute software instructions. In various embodiments, the processing system 904 is implemented in various ways. For example, the processing system 904 can be implemented as one or more processing cores. In another example, the processing system 904 can include one or more separate microprocessors. In yet another example embodiment, the processing system 904 can include an application-specific integrated circuit (ASIC) that provides specific functionality. In yet another example, the processing system 904 provides specific functionality by using an ASIC and by executing computer-executable instructions.

The secondary storage device 906 includes one or more computer storage media. The secondary storage device 906 stores data and software instructions not directly accessible by the processing system 904. In other words, the processing system 904 performs an I/O operation to retrieve data and/or software instructions from the secondary storage device 906. In various embodiments, the secondary storage device 906 includes various types of computer storage media. For example, the secondary storage device 906 can include one or more magnetic disks, magnetic tape drives, optical discs, solid state memory devices, and/or other types of computer storage media.

The network interface card 908 enables the computing device 806 to send data to and receive data from a communication network. In different embodiments, the network interface card 908 is implemented in different ways. For example, the network interface card 908 can be implemented as an Ethernet interface, a token-ring network interface, a fiber optic network interface, a wireless network interface (e.g., WiFi, WiMax, etc.), or another type of network interface.

The video interface 910 enables the computing device 806 to output video information to the display unit 912. The display unit 912 can be various types of devices for displaying video information, such as a cathode-ray tube display, an LCD display panel, a plasma screen display panel, a touch-sensitive display panel, an LED screen, or a projector. The video interface 910 can communicate with the display unit 912 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 914 enables the computing device 806 to communicate with external devices. For example, the external component interface 914 can be a USB interface, a FireWire interface, a serial port interface, a parallel port interface, a PS/2 interface, and/or another type of interface that enables the computing device 806 to communicate with external devices. In various embodiments, the external component interface 914 enables the computing device 806 to communicate with various external components, such as external storage devices, input devices, speakers, modems, media player docks, other computing devices, scanners, digital cameras, and fingerprint readers.

The communications medium 916 facilitates communication among the hardware components of the computing device 806. In the example of FIG. 9, the communications medium 916 facilitates communication among the memory 902, the processing system 904, the secondary storage device 906, the network interface card 908, the video interface 910, and the external component interface 914. The communications medium 916 can be implemented in various ways. For example, the communications medium 916 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 902 stores various types of data and/or software instructions. For instance, in the example of FIG. 9, the memory 902 stores a Basic Input/Output System (BIOS) 918 and an operating system 920. The BIOS 918 includes a set of computer-executable instructions that, when executed by the processing system 904, cause the computing device 806 to boot up. The operating system 920 includes a set of computer-executable instructions that, when executed by the processing system 904, cause the computing device 806 to provide an operating system that coordinates the activities and sharing of resources of the computing device 806. Furthermore, the memory 902 stores application software 922. The application software 922 includes computer-executable instructions, that when executed by the processing system 904, cause the computing device 806 to provide one or more programs for use. The memory 902 also stores program data 924. The program data 924 is data used by programs that execute on the computing device 806.

The term computer readable media as used herein may include computer storage media and communication media. Computer storage media is distinguished from communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data.

By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A railway track switch heating system for melting snow and ice on a track switching system comprising:
   at least three heating elements configured to be connected to different remote locations on the track switching system, wherein at least one of the heating elements is connected to a section of rail;
   a controller configured to intermittently turn on and off the at least three heating elements in a power save mode, wherein the controller is configured to turn on and off the at least three heating elements in a sequence that minimizes the variation in the overall current draw of the heating system;
   wherein the controller is configured to automatically switch a heating element of the at least three heating elements from a full power mode to the power save mode once a sensed temperature associated with the heating element exceeds a predetermined threshold;
   wherein when each of the heating elements transition into the power save mode the controller automatically groups the heating element into a first group of heating elements and a second group of heating elements;
   wherein the difference in total amperage draws between the first group and second group are minimized;
   wherein the difference in the total amperage draw between the first group and second group is no more than the maximum amperage draw of any single heating element;
   wherein the controller is configured to turn on and off the first group of heating elements and the second group of heating elements in sequence in the power save mode;
   wherein the controller is configured to automatically regroup the heating elements as more of the heating elements transition into the power save mode.

2. The railway track switch heating system of claim 1, further comprising at least one temperature sensor.

3. The railway track switch heating system of claim 1, wherein the heating system is configured to be powered via connection to a VAC source.

4. A method of heating using multiple remotely located heating elements powered by a single voltage source comprising:
   identifying the amperage draw of the multiple remotely located heating elements;
   grouping the multiple remotely located heating elements that are to be operated in a power save mode into groups in a manner such that the difference between the total amperage draws between the groups is minimized; and
   alternating the activation of the heaters in a first group with the heaters in a second group;
   wherein the first group and the second group are created such that the difference between the amperage draws between the two groups is less than the largest amperage draw of any single heating element;
   wherein the step of grouping the multiple remotely located heating elements follows the transition of each of the heating elements into the power save mode.

5. The method of claim 4, wherein transition into the power save mode is triggered by a temperature of the subject matter that is being heated by the heating element.

* * * * *